US011621928B2

(12) United States Patent
Marzorati et al.

(10) Patent No.: US 11,621,928 B2
(45) Date of Patent: Apr. 4, 2023

(54) REDUCING TOIL IN CHAT ENVIRONMENTS

(71) Applicant: KYNDRYL, INC., New York, NY (US)

(72) Inventors: Mauro Marzorati, Lutz, FL (US); Gary Francis Diamanti, Wake Forest, NC (US); Raghuram Srinivasan, Aurora, IL (US); Jeremy R. Fox, Georgetown, TX (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/411,146

(22) Filed: Aug. 25, 2021

(65) Prior Publication Data
US 2023/0061720 A1 Mar. 2, 2023

(51) Int. Cl.
*H04L 51/00* (2022.01)
*G06N 5/04* (2006.01)
*G06F 40/205* (2020.01)
*H04L 67/30* (2022.01)
*G06N 20/00* (2019.01)

(52) U.S. Cl.
CPC ............ *H04L 51/00* (2013.01); *G06F 40/205* (2020.01); *G06N 5/04* (2013.01); *G06N 20/00* (2019.01); *H04L 67/30* (2013.01)

(58) Field of Classification Search
CPC ....... H04L 51/00; H04L 67/30; G06F 40/205; G06N 5/04; G06N 20/00
See application file for complete search history.

(56) References Cited

U.S. PATENT DOCUMENTS 8,751,559 B2 6/2014 Richardson et al.
11,139,993 B2 * 10/2021 Bourassa-Denis ...... H04L 51/52
(Continued)

OTHER PUBLICATIONS

Lane et al., "Harness ChatOps to Empower Remote Collaboration", for Infrastructure & Operations Professionals, Forrester, Dec. 21, 2020, 2 pages. https://www.forrester.com/report/Harness+ChatOps+To+Create+TechnologyAugmented+Teams/-/E-RES153381.
(Continued)

*Primary Examiner* — Austin J Moreau
*Assistant Examiner* — Chhian (Amy) Ling
(74) *Attorney, Agent, or Firm* — Erik Swanson; Andrew M. Calderon; Calderon Safran & Cole, P.C.

(57) ABSTRACT

A computer-implemented method reduces toil in chat systems. The method includes receiving, from a sending account, a message to be sent in a chat environment, where the chat environment includes a plurality of accounts including the sending account. The method also includes determining, by a learning model, a category of the message. The method further includes generating, for each account of the plurality accounts in a channel of the chat environment, a score, where the score indicates a likelihood an associated account will respond to a post with relevant information. The method includes recommending, based on the score, one or more accounts of the plurality of accounts to an at message, where the at message is configured to cause a notification to the associated account. The method further includes posting the message in the channel of the chat environment while at-mentioning the one or more accounts.

19 Claims, 5 Drawing Sheets

(56) References Cited

U.S. PATENT DOCUMENTS

| | | | | |
|---|---|---|---|---|
| 2010/0070554 | A1* | 3/2010 | Richardson | H04L 67/306 709/202 |
| 2018/0025726 | A1 | 1/2018 | De Bayser et al. | |
| 2020/0145358 | A1 | 5/2020 | Yegorin et al. | |
| 2020/0344183 | A1* | 10/2020 | Mummidi | G06N 20/00 |
| 2021/0029064 | A1* | 1/2021 | Higgins | G06Q 10/06393 |
| 2022/0198779 | A1* | 6/2022 | Saraee | G06V 10/82 |
| 2022/0210033 | A1* | 6/2022 | Higgins | H04L 41/5093 |

OTHER PUBLICATIONS

Avrahami et al., "Responsiveness in Instant Messaging: Predictive Models Supporting Inter-Personal Communication," Proceedings of the SIGCHI Conference on Human Factors in Computing Systems, ACM, 2006, pp. 731-740.

Mahmud et al., "Recommending Targeted Strangers from Whom to Solicit Information on Social Media," Proceedings of the 2013 International Conference on Intelligent User Interfaces, 2013, 11 pages.

"A Method for a User-Driven or Policy-Based Group Chat Holler," IPCOM000242524D, IP.com, Jul. 22, 2015, 2 pages.

"A System and Method to Suggest Context-Appropriate Names for @Mentions," IPCOM000257299D, IP.com, Jan. 30, 2019, 6 pages.

"Manage who can notify a channel or workspace". Slack Help Center, printed Jun. 17, 2021, 2 pages. https://slack.com/help/articles/115004855143-Manage-who-can-notify-a-channel-or-workspace.

"frostbtn/readme.md", GitHub Gist, printed Jun. 17, 2021, 5 pages. https://gist.github.com/frostbtn/ad2d079aaecfde3ae97c27c8d3167a30.

"What is ChatOps", ChatOps, IBM, printed Jun. 17, 2021, 4 pages. https://w3.ibm.com/w3publisher/chatops.

"ChatOps for IBM Services", IBM, printed Jun. 17, 2021, 1 page. https://w3.ibm.com/w3publisher/chatops/chatops-solutions/chatops-for-ibm-services.

"The Total Economic Impact™ of IBM's Design Thinking Practice", Forrester, Feb. 2018, 48 pages. https://www.ibm.com/design/thinking/static/Enterprise-Design-Thinking-Report-8ab1e9e1622899654844a5fe1d760ed5.pdf.

"IBM to Acquire Nordcloud to Turbocharge Its Hybrid Cloud Consulting Capability", IBM News Room, IBM, Dec. 2020, 2 pages. https://newsroom.ibm.com/2020-12-21-IBM-to-Acquire-Nordcloud-to-Turbocharge-Its-Hybrid-Cloud-Consulting-Capability.

Hand, "ChatOps essential guide: The basics, benefits, and challenges", TechBeacon, printed Jun. 17, 2021, 7 pages. https://techbeacon.com/enterprise-it/chatops-essential-guide-basics-benefits-challenges.

Mell et al., "The NIST Definition of Cloud Computing", Recommendations of the National Institute of Standards and Technology, Special Publication 800-145, Sep. 2011, 7 pages.

\* cited by examiner

REDUCING TOIL IN CHAT ENVIRONMENTS

BACKGROUND

The present disclosure relates to communications systems, and, more specifically, to reducing toil caused by chat environments.

A team-based perpetual chat platform can enable and improve collaboration among teams, both distributed and concentrated. The interactions can vary between a large number of users/accounts where all or some are able to contribute to one-on-one discussions. In open forums, users may call attention to specific users/accounts to trigger a notification. The notification can be intended to catch the attention of the target.

SUMMARY

Disclosed is a computer-implemented method to reduce toil in chat systems. The method includes receiving, from a sending account, a message to be sent in a chat environment, wherein the chat environment includes a plurality of accounts including the sending account. The method also includes determining, by a learning model, a category of the message. The method further includes generating, for each account of the plurality accounts in a channel of the chat environment, a score, wherein the score indicates a likelihood an associated account will respond to a post with relevant information. The method includes recommending, based on the score, one or more accounts of the plurality of accounts to at message, wherein the at message is configured to cause a notification to the associated account. The method further includes posting the message in the channel of the chat environment while at-mentioning the one or more accounts. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
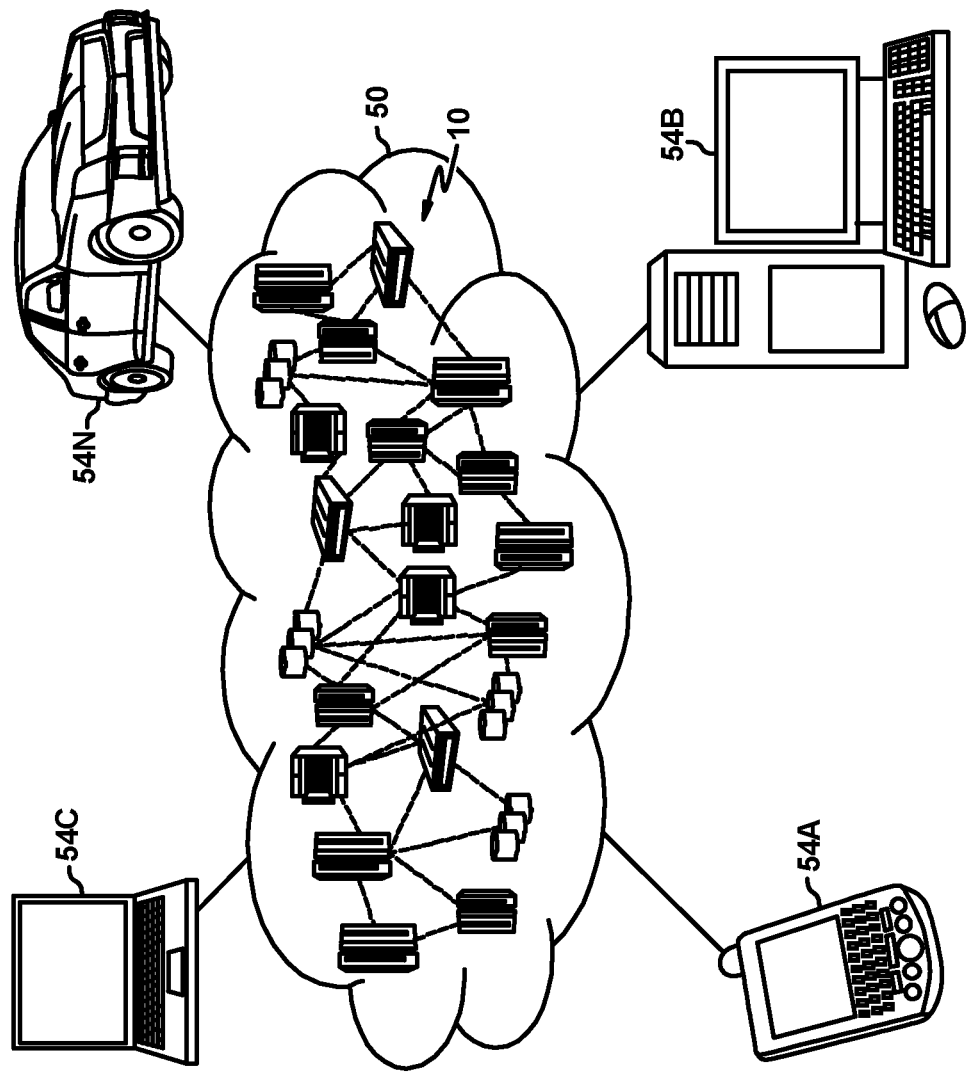
FIG. 1 depicts a cloud computing environment according to an embodiment of the present invention.

Cloud computing in general.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
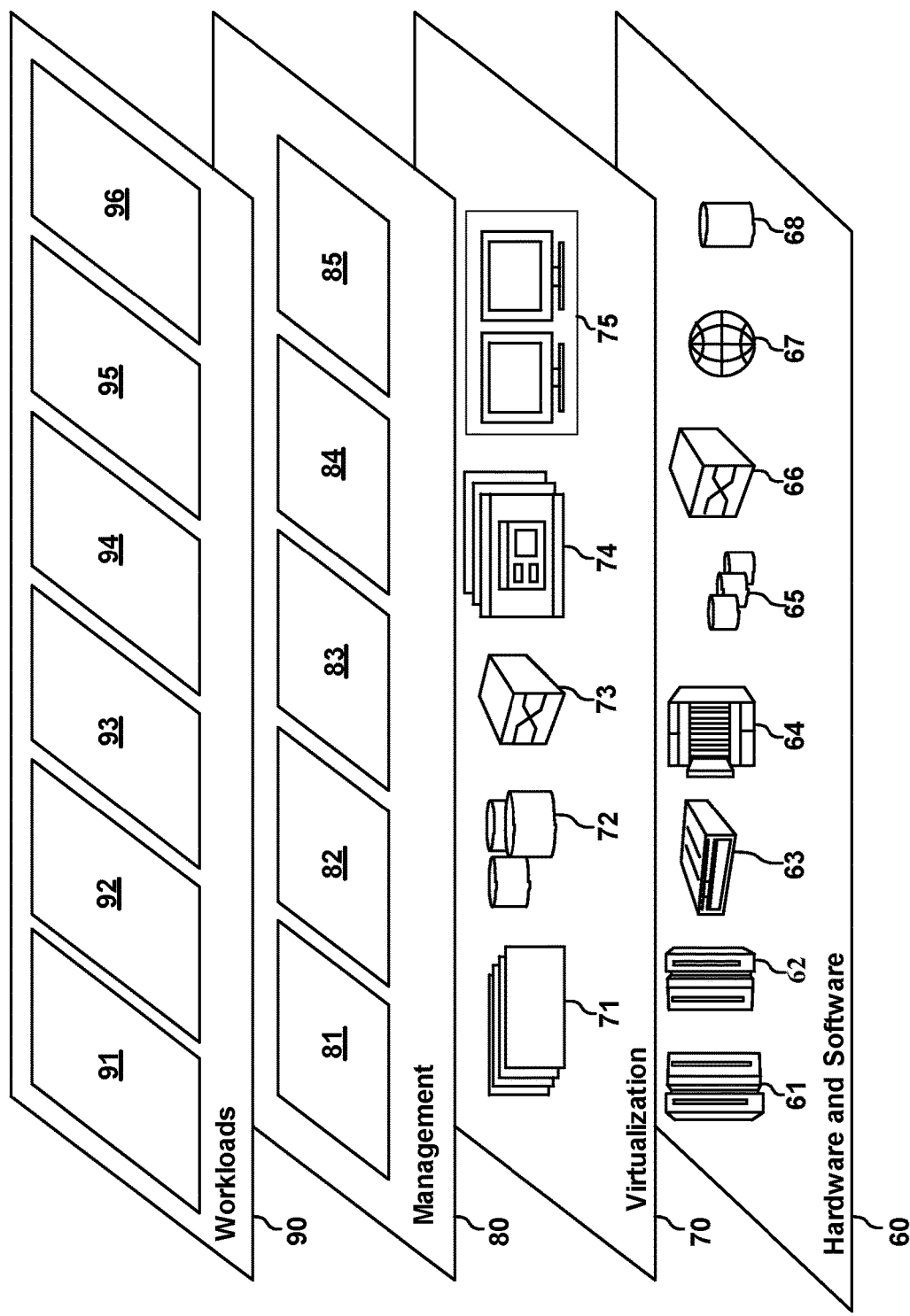
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and nuisance limiter 96.

Data Processing System in General

Figure 3:
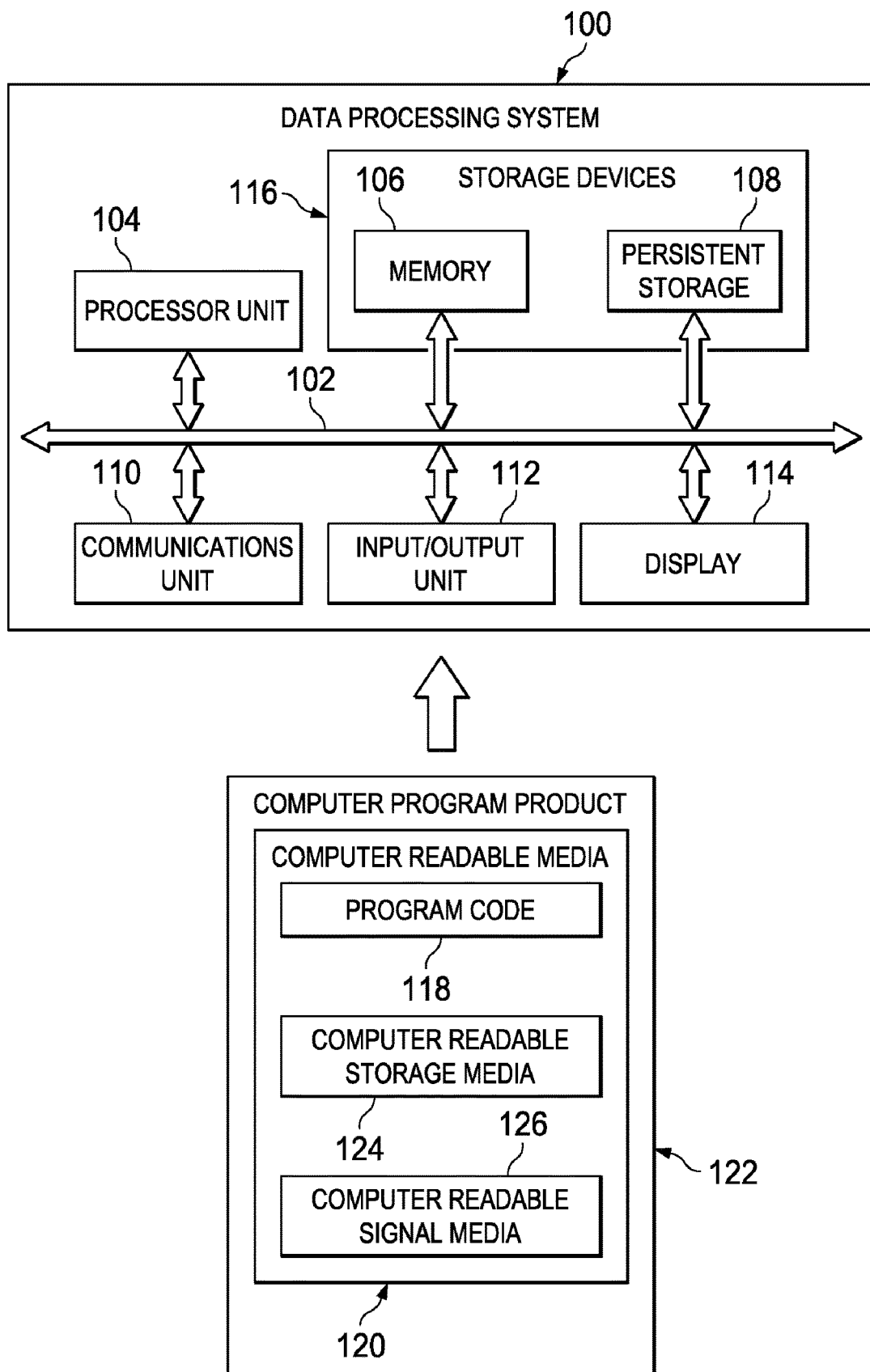
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100.

Team-based perpetual chat platform can enable and improve collaboration among teams, both distributed and concentrated. The interactions can vary between a large number of users/accounts where all or some are able to contribute to small or even one-on-one discussions. In open forums, users may call attention to specific users/accounts to trigger a notification. The notification can be intended to catch the attention of the target account. The practice of calling attention to specific users can be known as at-mentioning (@mentioning). Although the use of an "@" symbol is a common mechanism for doing so, the term "at-mentioning", as used herein, is defined as any mechanism that may be used to call attention to specific users.

In some embodiments, a channel can be a page/group within the chat platform that is directed to a particular topic or has a number of users above two. Some channels can have hundreds of users or more. Larger channels with a high number of users and/or a relatively large number of communications can generate an excessive/disruptive number of notifications for all accounts in a channel. This can cause unnecessary toil for the users. Toil can be defined as work that is one or more of manual, repetitive, automatable, tactical, devoid of enduring value, and that scales linearly as a service grows. Servicing notifications in a chat environment can be a type of toil.

Embodiments of the present disclosure can reduce toil and/or reduce the unwanted and/or unnecessary notifications. Embodiments of the present disclosure implement a nuisance limiter (or disruption limiter). In some embodiments, the nuisance limiter can be integrated into the functionality of chat system and/or an at-mentioning manager (or mentioning manager). In some embodiments, the nuisance limiter can reduce the number of accounts that get notified of a new message, while at the same time allowing for all users in the channel to view the message and any response at a future time without being interrupted.

In some embodiments, larger channels can have some of the accounts in the channel that message and/or respond at a higher rate than other accounts. Some channels can have accounts that are considered speakers and other listeners, while others may have leaders (e.g., manager, moderator, etc.) and followers (e.g., employees, etc.). Any account can have any characteristics. The larger the channel and/or the higher number of channels that are available can make it more difficult for a standard user to know/learn which accounts are most likely to response and/or possess an appropriate response.

In some embodiments, the nuisance limiter can be configured to automatically target messages to a subset of the accounts in a channel. The nuisance limiter can remove excess targets and/or add specific target accounts and push a notification only to the selected accounts. In some embodiments, the selected accounts are the accounts that are most likely to response and/or most likely to have information to provide an appropriate response.

In some embodiments, the nuisance manager can use one or more leaning models. The leaning models can be configured to predict, based on a message, which accounts have the highest probability of responding with accurate information. The learning model can analyze historical uses of one or more channels, profiles associated with each account, and other relevant factors.

In some embodiments the nuisance limiter can generate an activity score (or response score) for each account. In some embodiments, the response score can be generated for and unique to each channel, each topic of message, and/or a sender. The response score can indicate a likelihood that a specific account will respond a message that is posted in a channel. The score can be configured to account for posts to all accounts and/or at messages to the specific account.

In some embodiments, the nuisance limiter can generate a knowledge score for each account. The knowledge score can represent a likelihood the account (or an associated user) has the information to provide an appropriate response. In some embodiments, the activity score and the knowledge score can be combined to form an overall confidence score. In some embodiments, the overall score is compiled/generated in response to the nuisance limiter receiving a new message.

In some embodiments, the nuisance limiter can suggest/recommend one or more accounts to at message (or target) for a new message (or inquiry). The nuisance limiter can determine a subject of the message. In some embodiments, the recommendations are based on the subject of the message, the activity score, the knowledge score, and/or the overall score. In some embodiments, the recommendation can be a specific number of accounts (e.g., the top 5, or top 5%) based on the various scores. In some embodiments, the recommendation can account for account status updates or a current status of the account (e.g., out-of-office indication, busy indication, do not disturb indication, etc.). For example, if one account indicates an associated user is on vacation, it will not be recommended even if the score would otherwise indicate a good response. In some embodiments, the account status updates can be incorporated into the activity score.

In some embodiments, nuisance limiter can recommend posting the message in a different channel, based on the content of the message. For example, a user may have an inquiry related to employee benefits but is trying to post the inquiry in a general information channel. The nuisance limiter can suggest moving to a channel that has past posts and good responses to benefits inquiries.

In some embodiments, the nuisance limiter can allow the message poster to manually select (e.g., override) and/or remove additional accounts to the recommended accounts. In some embodiments the user can validate the accounts to be notified.

The aforementioned advantages are example advantages, and embodiments exist that can contain all, some, or none of the aforementioned advantages while remaining within the spirit and scope of the present disclosure.

Figure 4:
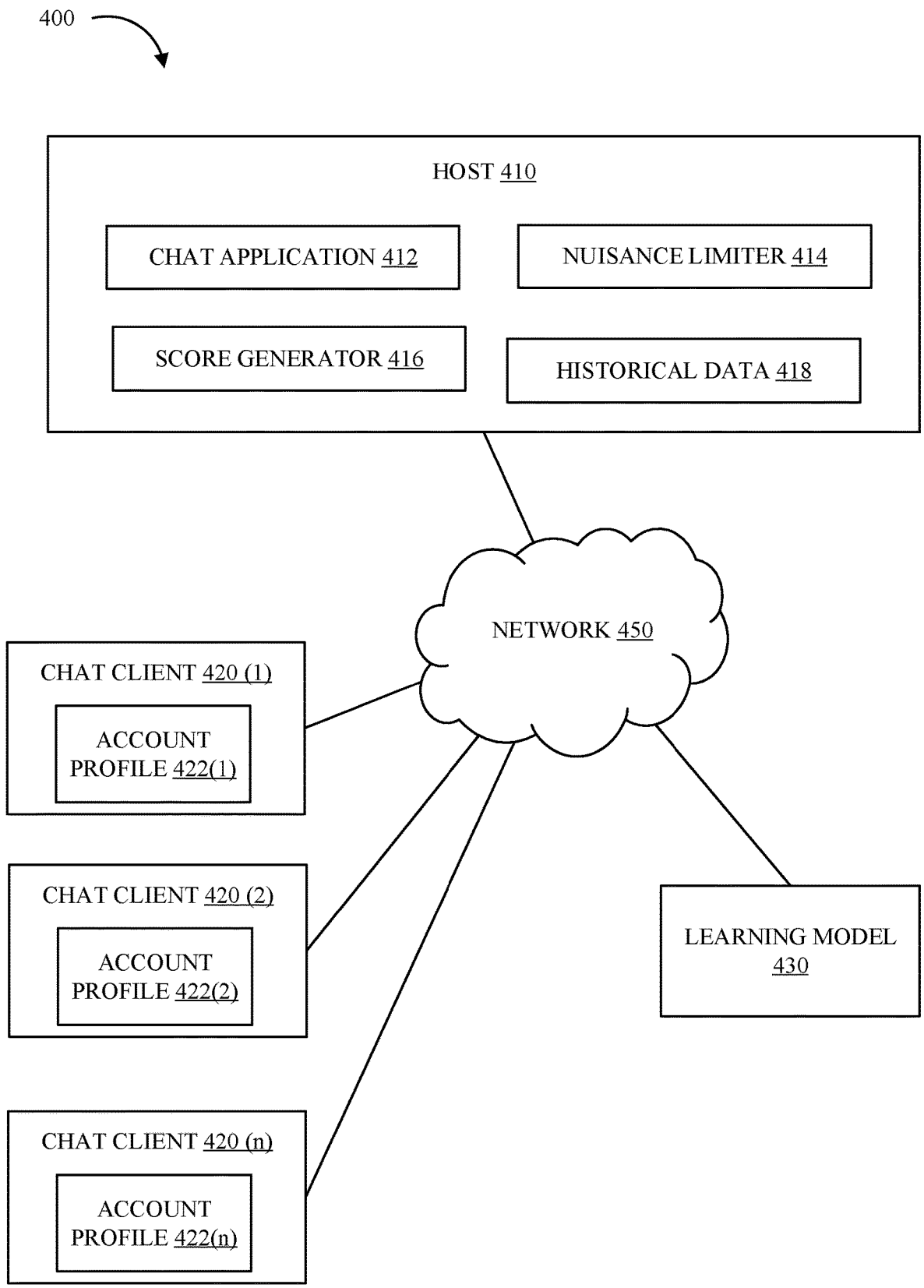
FIG. 4 illustrates a functional diagram of a computing environment suitable for operation of a nuisance limiter in accordance with some embodiments of the present disclosure.

Referring now to various embodiments of the disclosure in more detail, FIG. 4 is a representation of a computing environment 400, that is capable of running a nuisance limiter in accordance with one or more embodiments of the present disclosure. Many modifications to the depicted environment may be made by those skilled in the art without departing from the scope of the disclosure.

Computing environment 400 includes host 410, chat client 420(1), chat client 420(2), through chat client 420(n), learning model 430, and network 440. Chat client 420(1), chat client 420(2), through chat client 420(n) represent any number of additional chat clients and each can be referred to as chat client 420 individually, collectively, and/or severally.

Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications host 410, chat client 420, learning model 430, and other computing devices (not shown) within computing environment 400. In some embodiments, host 410, chat client 420, learning model 430, and/or their subcomponents may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes chat application 412, nuisance limiter 414, score generator 416, and historical data 418.

In some embodiments, host 410 includes a natural language processor. In some embodiments, a natural language processing system may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from chat application 412. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., previously sent messages). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a message from an account at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

Chat application 412 can be any combination of hardware and/or software configured to allow for communication between two or more accounts (profiles, users, etc.). In some embodiments, chat application 412 can provide an interface and functionality that allows one account to input a message and send that message to one or more additional accounts (or targets). In some embodiments, chat application 412 can include one or more channels and/or groups. The channels/groups can be organized in any manner. For example, one channel can be for a team working on a particular project, one channel can be for a division for a company, one channel can be for a group of friends, one channel can be for specific office of a company, one channel can be based on a specific topic, and the like. In some embodiments, a channel can be a subchannel of another channel. For example, a first channel can be a division of a company, a second channel can be for a project within that division, where each member of the second channel is a member of the first channel, but not all members of the first channel and members of the second channel. In some embodiments, each account can be added into one or more of the channels.

In some embodiments, chat application 412 can include one or more of nuisance limiter 414, score generator 416, and historical data 418, however, each are shown as separate components for discussion purposes.

Nuisance limiter 414 can be any combination of hardware and/or software configured to reduce toil for accounts in chat application 412. In some embodiments, nuisance limiter 414 can identify accounts within chat application 412 that are most likely to respond to a message. The message can be generated by any account within chat application 412 and targeted to any and/or all other accounts within chat application 412 and/or one or more channels of chat application 412. In some embodiments, nuisance limiter 414 includes can include score generator 416 and/or historical data 418.

In some embodiments, nuisance limiter 414 can recommend at-mentioning one or more profiles. In some embodiments, the recommended profiles can be the same or different than initially submitted by the sending account. In some embodiments, the recommended profiles can be based on the one or more scores generated by score generator 416. In some embodiments, the recommendations are in response to a score being above a predefined threshold. The threshold can be set for any number of the generated scores. For example, there can be a threshold for one or more of the activity score, the knowledge score, and the overall score. In some embodiments, the number of accounts recommended is based on a set point. The set point can be a number of accounts (e.g., the three highest scores). The set point can be a percentage of the account in a specific channel/group (e.g., top 3% of scores).

In some embodiments, nuisance limiter 414 can recommend the message be posted in a specific group/channel. In some embodiments, a sending account can input the message and request a recommendation. In some embodiments, nuisance limiter 414 can, based on the message input into a first channel, recommend the message be moved to a different, more relevant, channel. In some embodiments, the more relevant channel can be a channel where an account in the other channel has a score higher/greater than any score in the current channel. In some embodiments, the more relevant channel can be a channel where an account in the other channel has a score above the predefined threshold.

In some embodiments, nuisance limiter 414 can display a number of accounts that will not be notified based on the recommendations. For example, there is channel that has one hundred accounts, and the threshold is top 3%. If the initial message was input to notify all members of the channel, nuisance limiter 414 can recommend the top three scores and indicate that 97 members will not be notified. Additionally, nuisance limiter 414 can display an estimated time saved by the 97 accounts not notified of a new message.

Score generator 416 can be any combination of hardware and/or software configured to predict a likelihood an account will respond to a comment/post in chat application 412. The score can indicate a likelihood of response and/or a likelihood the response will include relevant information (or the associated account/user has the relevant information). In some embodiments, score generator 416 can generate two or more separate scores.

In some embodiments, score generator 416 can determine a context of a message. The determination can be made after the sending account enters the message but prior to sending the message to any target accounts. In some embodiments, score generate 416 can determine if the message is seeking a response. In some embodiments, score generator 416 can identify a context/category of the request. In some embodiments, chat application 412 includes a predetermined set of categories (e.g., benefits, etc.). In some embodiments, the categories can be dynamic. The category can be based on similarities/differences to previous messages.

In some embodiments, score generator 416 generates/calculates an activity score (or response score). The activity score can represent a likelihood/probability an account, other than the message sender, will respond to the messages/post. In some embodiments, the activity score is based on analyzing each accounts past activity. The analysis can be based on activity in chat application 412 and/or in a specific channel of chat application 412. The past activity can be stored in historical data 418. In some embodiments, the data is analyzed by learning model 430.

In some embodiments, score generator 416 calculates a knowledge score. The knowledge score represents a likelihood/probability the account (target account) has the knowledge/information to provide a relevant response. In some embodiments, the knowledge score can be based on past usage of chat application 412.

In some embodiments, score generator 416 can use an urgency of the message as a factor in one or more of the scores. The urgency represents how the relevance of the information provided will change. For example, if a message asks, "What room is the meeting in that starts in 30 minutes?" that can have a high urgency, because a delayed response becomes irrelevant once the meeting has started/completed. Another example, if the message asks, "What restaurant do we want to eat at next week?" would have a low urgency, as a response is a few days can be a relevant as a response in five minutes.

In some embodiments, score generator 416 can generate/calculate an overall score. The overall score can be a combination of the activity score and the knowledge score. In some embodiments, the overall score is a summation of the two scores. In some embodiments, the overall score is based on weighting the two scores. The scores can be weighted in any manner (e.g., 25/75, 50/50, 75/25, etc.). For example, an account that frequently responds to posts with additional phrases such as "good question" can have a high activity score, but a low knowledge score. The overall score can be based the weighing and/or urgency factors. Another example, an account that has posted once on a specific topic with relevant information can have a high knowledge score and a low activity score.

Historical data 418 can be any combination of hardware and/or software configured to store historical data related to one or more accounts/users that use chat application 412. In some embodiments, historical data 418 can include previous messages, previous responses, time spent viewing messages, time to check notifications, channels added, channels deleted, notification silencing, and the like. Historical data 418 can be analyzed by learning model 430. In some embodiments, historical data 418 is updated after each message and/or at the end of a predefined period of time (e.g., each day, each week, etc.). In some embodiments, historical data 418 can be used as training data for learning model 430.

Chat client 420 can be any computing device configured to run a local version of chat application 412. Chat client 420 can provide an interface for an account/user to input messages, view messages, and/or respond to message. In some embodiments, chat client 420 includes a notification system (e.g., noise, haptics, etc.). The notification system can be configured to notify a user associated with an account, that an at message is targeted at the account. In some embodiments, chat client 420 can include one or more account profile 422.

In some embodiments, chat client 420(1), chat client 420(2), and chat client 420(n) include account profile 422 (1), account profile 422(2), and account profile 422(n) respectively, where n is any integer. However, account profile 422(1), account profile 422(2), and account profile 422(n) can be referred to as account profile 422 individually, severally, or collectively.

Account profile 422 can be any set of data related to an account. In some embodiments, account profile 422 can be associated with a user and/or a position (e.g., manager of division, etc.). Each account in chat application 412 can have a unique profile. In some embodiments, two or more account profiles. In some embodiments, account profile can have updatable options. The options can allow an associated user to specify types of knowledge that the account has access to. The categories can be correlated with categories determined by score generator 416. In some embodiments, account profile 422 can provide an indication on whether the account is willing to respond to questions. The indication can be used in determining the activity score. In some embodiments, each chat account profile 422 can be associated with one or more chat client 420.

Learning model 430 can be any combination of hardware and/or software configured to predict various attributes for messages in chat application 412. In some embodiments, learning model 430 can include two or more separate models. In some embodiments, learning model 430 can classify a message. The classification can include identifying a category/intent of the message. This can include determine whether the message is seeking information and/or providing information. In some embodiments, the learning model can be configured to generate/calculate one or more of the activity score, the knowledge score, and the overall score for each account and for each message. In some embodiments, learning model 430 can generate the scores based on account profile 422, historical data 418, and other relevant data.

In some embodiments, learning model 430 can be trained by historical data 418. In some embodiments, learning model 430 can be updated as additional data is added to historical data 418. In some embodiments, learning model 430 can be incorporated into nuisance limiter 414 and/or score generator 416.

In some embodiments, learning model 430 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 5:
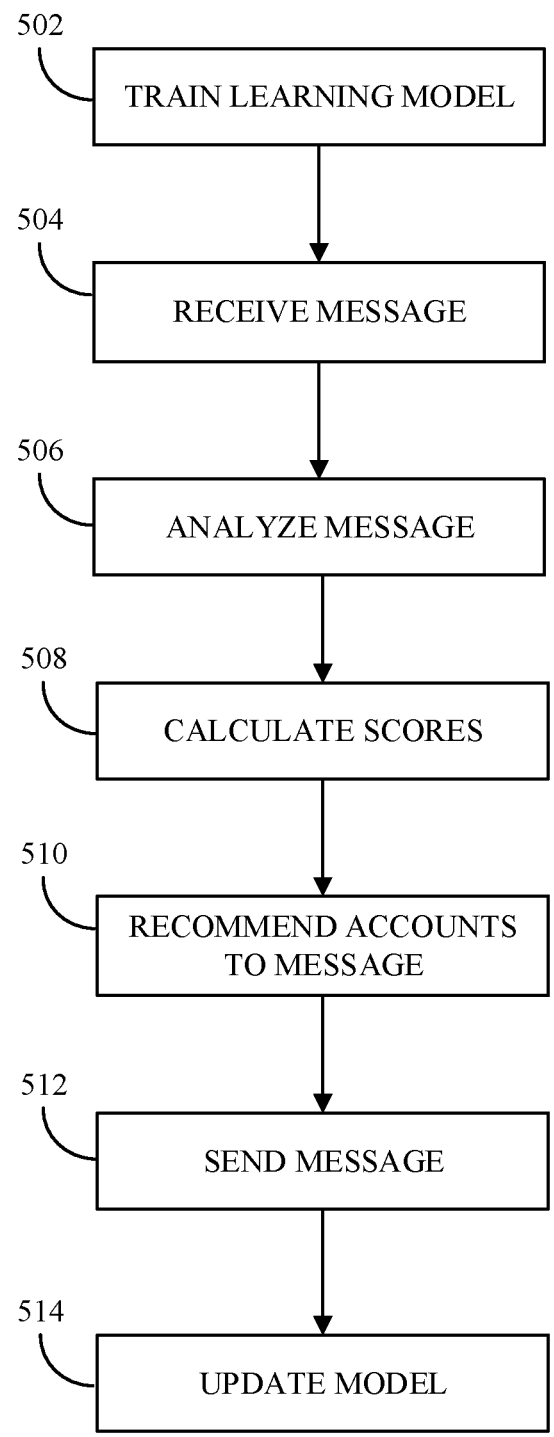
FIG. 5 illustrates a flow chart of an example method to reduce toil in chat environments, in accordance with some embodiments of the present disclosure.

FIG. 5 depicts a flowchart of an example method, method 500, for reducing toil in chat systems that can be performed in a computing environment (e.g., computing environment 400 and/or cloud computing environment 50). One or more of the advantages and improvements described above for reducing toil in chat systems may be realized by method 500, consistent with various embodiments of the present disclosure.

Method 500 can be implemented by one or more processors, host 410, chat application 412, nuisance limiter 414, score generator 416, historical data 418, chat client 420, account profile 422, learning model 430 and/or a different combination of hardware and/or software. In various embodiments, the various operations of method 500 are performed by one or more of host 410, chat application 412, nuisance limiter 414, score generator 416, historical data 418, chat client 420, account profile 422, learning model 430. For illustrative purposes, the method 500 will be described as being performed by nuisance limiter 414 for discussion purposes.

At operation 502, nuisance limiter 414 trains a learning model. In some embodiments, the learning model can be learning model 430. In some embodiments, the training is based on data stored in historical data 418. In some embodiments, the training is based on information in account profile 422.

In some embodiments, the training is configured to identify accounts that are likely to respond to a message/questions in chat application 412. In some embodiments, the learning model is trained to generate one or more scores. The score can include an activity score, a knowledge score, and an overall score. The activity score represents a likelihood an account (e.g., account profile 422) will respond to a message. The knowledge score represents a likelihood the account has relevant information to respond to the message and/or that a response will be useful the message sending account. In some embodiments, the learning model is trained to calculate the one or more scores based on a channel. For example, for the same account, a score in a first channel can be different from the score in a second channel. In some embodiments, the leaning model is trained to calculate a score for each account in chat application 412 and/or a channel/group.

In some embodiments, the learning model is trained to classify (categorize, etc.) the message. In some embodiments, the classification can be based on the content of the message. In some embodiments, the classification can be based on an input by the message generator. In some embodiments, the learning model is trained to identify a relevant channel. In some embodiments, a relevant channel can be any channel where a score exceeds a threshold. In some embodiments, the relevant channel can be based on a sum (or average) of all (or the top scores) for a particular channel. For example, a relevant channel can be any channel where the average of the top 5 overall scores in a channel exceed a threshold and/or are the highest of the analyzed channels. In some embodiments, the learning model is trained to recommend a relevant channel.

In some embodiments, the learning model is trained to identify messages that are seeking information. In some embodiments, the messages are either seeking or sending information. In some embodiments, the scores are generated only for messages seeking information.

At operation 504, nuisance limiter 414 receives a message. In some embodiments, the message is received from an account. The account can be associated with an account profile 422. In some embodiments, the message is received into a channel. In some embodiments, the message is generated by a user associated with the account. The message can be seeking information.

At operation 506, nuisance limiter 414 analyses the message. In some embodiments, the analysis can be performed by one or more of the natural language processors, score generator 416, and learning model 430. In some embodiments, the analysis includes categorizing the message. The categorizing can include identifying an intent of the message. The intent can include a determination on whether the message is seeking information. In some embodiments, the classification can identify subject matter In some embodiments, the analysis can determine an urgency for the message. The urgency is relative time frame when a response is useful. For example, if a message asks, "where is the meeting today" it would have a relatively high urgency, as a response after the meeting would be moot. If the message asks about company benefits, the message would have a relatively low urgency, as the answer will likely be useful for a long period of time.

At operation 508, nuisance limiter 414 calculates one or more scores. In some embodiments, calculating the one or more scores includes analyzing the message. In some embodiments, the one or more scores are generated by score generator 416 and/or the learning model.

In some embodiments, an activity score is generated. The activity score can be based on previous actions performed by the account. The actions can include posting messages, checking notifications, responding to messages, online time (e.g., active, away, in meetings, etc.), work schedule (e.g., weekend vs. weekday), and other similar factors. In some embodiments, the activity score can be based on a current status of the account and/or an urgency of the message. The current status can mean if the account is currently active (e.g., online, away, in a meeting, etc.).

In some embodiments, a knowledge score is generated. The knowledge score can be based on previous responses and/or messages, account profile, and other similar factors. The account profile can include categories that the account has indicated as knowledgeable. In some embodiments, the knowledge is based on an account title. For example, if an account is associated with a human resources group, the knowledge for benefit questions can be relatively high.

In some embodiments, an overall/total score is generated. The total score can be any combination of the activity score and the knowledge score. For example, the two scores can be added together. Another example, each score may be given a weighting factor. In some embodiments, the one or more scores are calculated for each account in the channel, and/or one or more additional channels.

At operation 510, nuisance limiter 414 recommends one or more target accounts to at message. In some embodiments, the target accounts can be based the one or more scores generated in operation 508. In some embodiments, the highest number of scores are recommended. The highest number can be a number (e.g., top 3), a top percentage (e.g., top 2%), and/or a combination. The combination can be, for example, the top 2% of scores not to exceed 5.

In some embodiments, the recommendation can be based on one or more of the scores in any combination. In one example, the recommendation can be based only on the overall score. In another example, the recommendations can be based on all the scores. In this case, three accounts can be recommended, the account with the highest activity score, the account with the highest knowledge score, and the account with the highest overall score.

In some embodiments, the recommendation includes an alternate channel/group to send the message. The alternate channel recommendation can be based on the scores for the other channels. In some embodiments, the alternate channel recommendation is based on at least one account in the alternate channel having a score above a threshold (or a channel switching threshold). In some embodiments, the channel switching threshold is based on the scores determined in operation 508. The threshold can be the highest score (one or more of any of the scores). The recommendation to switch channels will only be made if the highest score in an alternate channel exceeds or is greater than the highest score in the current channel. In some embodiments, the threshold can be based on the lowest recommended score. For example, if a score in an alternate channel is higher than any of the scores that would otherwise be recommended, then nuisance limiter 414 can recommended the alternate channel. In some embodiments, the threshold is based an average of the top scores, or scores that would be recommended for each channel. For example, if nuisance limiter 414 is configured to recommend the top three accounts per channel, the threshold can be based on the average of the top three in each channel. The recommendation for the alternate channel will be given if the alternate average score is higher than the current channel average score.

In some embodiments, an account can request a channel in which to post the message. In these embodiments, nuisance limiter 414 can recommend a channel based on the scored. The recommendation can be based on the methods and/or procedure for recommending an alternate channel.

At operation 512, nuisance limiter 414 sends the message. In some embodiments, the message is sent to accounts marked to receive the at message. In some embodiments, the message is sent to the recommended accounts. In some embodiments, operation 512 includes the sending account accepting the recommendations. In some embodiments, the sending account can add and one or more accounts to be at messages and/or remove one of the recommended accounts. In some embodiments, operation 512 includes displaying the number of accounts that will not be notified and/or an estimation of the amount of time saved by those accounts not being notified.

At operation 514, nuisance limiter 414 updates the learning model. In some embodiments, the update can be based on any response or non-response to the message. In some embodiments, the updating is based on feedback received from the account. For example, chat application 412 can ask a recommended account for feedback. The feedback can indicate whether the recommended account is willing to response and contains the type of knowledge to respond. In some embodiments, the feedback is attempting to assess the accuracy of the one or more scores for the account.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing toil in chat environment comprising:

receiving, from a sending account and over a network interface, a message to be sent in a chat environment, wherein the chat environment includes a plurality of accounts including the sending account;

determining, by a learning model, a category of the message;

generating, for each account of the plurality of accounts in a channel of the chat environment, a score, wherein the score indicates a likelihood an associated account will respond to a post with relevant information, wherein the channel is an alternate channel and the receiving the message is by a first channel in the chat environment, the method further comprising:

generating, for each account of the plurality of accounts in the first channel, a score;

determining a highest score from the alternate channel exceeds a highest score in the first channel; and recommending, based on the determining the highest score from the alternate channel exceeds the highest score in the first channel, the message be posted to the alternate channel;

recommending, based on the score, one or more accounts of the plurality of accounts to at message, wherein the at message is configured to cause a notification to the associated account; and posting the message in the channel of the chat environment and at-mentioning the one or more accounts.

2. The method of claim 1, further comprising:
training, by a set of training data, the learning model; and
updating, in response to the posting and based on responses to the posting, the learning model.

3. The method of claim 2, wherein the set of training data includes an account profile for each account of the plurality of accounts and previous activity of each account in each channel and additional channels of the chat environment, and
wherein the updating is further based on at least one of a response to the message, a non-response to the message, and feedback received from an account of the plurality of accounts.

4. The method of claim 1, wherein the score includes an activity score and a knowledge score, wherein the activity score represents a second likelihood each account will respond to the message and the knowledge score represents a third likelihood each account possesses knowledge relevant to the message.

5. The method of claim 4, wherein the score is a weighted combination of the activity score and the knowledge score.

6. The method of claim 5, wherein the activity score and the knowledge score are equally weighted.

7. The method of claim 6, wherein the activity score is based on an urgency of the message and a current status of the associated account.

8. The method of claim 1, wherein the recommending of the one or more accounts is based on the score for each of the one or more accounts being the highest of the plurality of accounts.

9. The method of claim 1, further comprising:
generating, for each account of the plurality of accounts in a second channel, a score; and
recommending, based on a highest score in the channel exceeding a highest score in the second channel, the message be posted to the channel,
wherein the posting to the channel is in response to the recommending the message be posted to the channel.

10. A system comprising:
a processor; and
a computer-readable storage medium communicatively coupled to the processor and storing program instructions which, when executed by the processor, are configured to cause the processor to:
receive, from a sending account and over a network interface, a message to be sent in a chat environment, wherein the chat environment includes a plurality of accounts including the sending account;
determine, by a learning model, a category of the message;
generate, for each account of the plurality of accounts in a channel of the chat environment, a score, wherein the score indicates a likelihood an associated account will respond to a post with relevant information, wherein the channel is an alternate channel and the receiving message is by a first channel in the chat environment, the method further comprising:
generating, for each account of the plurality of accounts in the first channel, a score;
determining a highest score from the alternate channel exceeds a highest score in the first channel; and
recommending, based on the determining the highest score from the alternate channel exceeds the highest score in the first channel, the message be posted to the alternate channel;
recommend, based on the score, one or more accounts of the plurality of accounts to at message, wherein the at message is configured to cause a notification to the associated account; and
post the message in the channel of the chat environment and at-mentioning the one or more accounts.

11. The system of claim 10, wherein the program instructions are further configured to cause the processor to:
train, by a set of training data, the learning model; and
update, in response to the posting and based on responses to the posting, the learning model.

12. The system of claim 11, wherein the set of training data includes an account profile for each account of the plurality of accounts and previous activity of each account in each channel and additional channels of the chat environment, and
wherein the updating is further based on at least one of a response to the message, a non-response to the message, and feedback received from an account of the plurality of accounts.

13. The system of claim 10, wherein the score includes an activity score and a knowledge score, wherein the activity score represents a likelihood each account will respond to the message and the knowledge score represents a likelihood each account possesses knowledge relevant to the message.

14. The system of claim 13, wherein the score is a weighted combination of the activity score and the knowledge score.

15. A computer program product, the computer program product comprising a computer readable storage medium having program instructions embodied therewith, the program instructions executable by a processing unit to cause the processing unit to:
receive, from a sending account and over a network interface, a message to be sent in a chat environment, wherein the chat environment includes a plurality of accounts including the sending account;
determine, by a learning model, a category of the message;
generate, for each account of the plurality of accounts in a channel of the chat environment, a score, wherein the score indicates a likelihood an associated account will respond to a post with relevant information, wherein the channel is an alternate channel and the receiving message is by a first channel in the chat environment, the method further comprising:
generating, for each account of the plurality of accounts in the first channel, a score;
determining a highest score from the alternate channel exceeds a highest score in the first channel; and
recommending, based on the determining the highest score from the alternate channel exceeds the highest score in the first channel, the message be posted to the alternate channel;
recommend, based on the score, one or more accounts of the plurality of accounts to at message, wherein the at message is configured to cause a notification to the associated account; and
post the message in the channel of the chat environment and at-mentioning the one or more accounts.

16. The computer program product of claim 15, wherein the program instructions are further configured to cause the processing unit to:
train, by a set of training data, the learning model; and
update, in response to the posting and based on responses to the posting, the learning model.

17. The computer program product of claim of claim 16, wherein the set of training data includes an account profile for each account of the plurality of accounts and previous activity of each account in each channel and additional channels of the chat environment, and wherein the updating is further based on at least one of a response to the message, a non-response to the message, and feedback received from an account of the plurality of accounts.

18. The computer program product of claim of claim 15, wherein the score includes an activity score and a knowledge score, wherein the activity score represents a likelihood each account will respond to the message and the knowledge score represents a likelihood each account possesses knowledge relevant to the message.

19. The computer program product of claim 18, wherein the score is a weighted combination of the activity score and the knowledge score.

\* \* \* \* \*